(12) United States Patent
Lai (10) Patent No.: US 12,504,110 B1
(45) Date of Patent: Dec. 23, 2025

(54) DISPLAY SUPPORT FACILITATING MULTI-DIRECTIONAL ADJUSTMENT AND BEING TELESCOPIC

(71) Applicant: Guangdong Vhood Electronic Technology Co., Ltd, Zhuhai (CN)

(72) Inventor: Haibin Lai, Zhuhai (CN)

(73) Assignee: Guangdong Vhood Electronic Technology Co., Ltd, Zhuhai (CN)

( * ) Notice: Subject to any disclaimer, the term of this patent is extended or adjusted under 35 U.S.C. 154(b) by 0 days.

(21) Appl. No.: 19/287,785

(22) Filed: Jul. 31, 2025

(30) Foreign Application Priority Data

Apr. 16, 2025 (CN) .......................... 202510472477.8

(51) Int. Cl.
*F16M 11/04* (2006.01)
*F16M 11/18* (2006.01)

(52) U.S. Cl.
CPC ........... *F16M 11/046* (2013.01); *F16M 11/18* (2013.01); *F16M 2200/047* (2013.01)

(58) Field of Classification Search
CPC ................. F16M 11/046; F16M 11/18; F16M 2200/047; G06F 1/1601
USPC ..................................................... 248/123.11
See application file for complete search history.

(56) References Cited

U.S. PATENT DOCUMENTS

| | | | |
|---|---|---|---|
| 9,857,020 B2 * | 1/2018 | Yeh | F16M 11/30 |
| 11,067,215 B2 * | 7/2021 | Lee | F16M 11/105 |
| 11,788,671 B2 * | 10/2023 | Huang | F16M 11/06 248/161 |
| 12,045,084 B2 * | 7/2024 | Kwon | F16M 13/022 |

* cited by examiner

*Primary Examiner* — Todd M Epps
(74) *Attorney, Agent, or Firm* — Birchwood IP (57) ABSTRACT

The present invention relates to the technical field of display supports, and specifically relates to a display support facilitating multi-directional adjustment and being telescopic, comprising a support body, a base, a lifting structure, a connecting structure, and a bearing member fixing structure, the base is arranged below the support body for fixing the support body, and the lifting structure is mounted on the support body for moving a bearing member up and down. The present invention may tilt up and down or swing left and right through rotating blocks and track correction blocks thereon, thereby enabling flat surfaces of rollers or side edges of a main body to be in direct contact with guide rails as little as possible and enabling curved surfaces of the rollers to be in contact with the guide rails as much as possible to increase friction forces during sliding.

10 Claims, 12 Drawing Sheets

DISPLAY SUPPORT FACILITATING MULTI-DIRECTIONAL ADJUSTMENT AND BEING TELESCOPIC

CROSS-REFERENCE TO RELATED APPLICATIONS

This application claims priority to Chinese Patent Application No. 202510472477.8, filed on Apr. 16, 2025, which is hereby incorporated by reference in its entirety.

TECHNICAL FIELD

The present invention relates to the technical field of display supports, and specifically relates to a display support facilitating multi-directional adjustment and being telescopic.

BACKGROUND

One end of a display support is generally fixed on a corresponding plane, and the other end of the display support is used for bearing an object to be borne. During bearing of the object, due to different user heights and use states, the end of the support that bears the object needs to be lifted.

At present, a sliding structure for lifting the support mainly has two structures. One is a locking and attaching type sliding rail with a lifting slider, wherein the sliding rail is used for driving guided lifting. The other one is a slider structure that increases a pulley structure of a bearing roller and other structures. Both the two structures have fixed friction forces and no space for automatic adjustment. Moreover, both the two existing lifting sliding structures need to be limited by means of locking screws.

SUMMARY

In view of the above situations, in order to overcome the defects in the prior art, a purpose of the present invention is to provide a display support facilitating multi-directional adjustment and being telescopic, which effectively solves the problem that friction forces of existing display supports are not easy to change with use states during use.

Technical solutions solved by the present invention are as follows: a display support facilitating multi-directional adjustment and being telescopic comprises a support body, a base, a lifting structure, a connecting structure, and a bearing member fixing structure, the base is arranged below the support body for fixing the support body, the lifting structure is mounted on the support body for moving a bearing member up and down, one end of the connecting structure is connected to the lifting structure, the other end of the connecting structure is connected to the bearing member fixing structure for externally extending the bearing member, and the bearing member fixing structure is used for mounting and displaying the bearing member;

the lifting structure comprises a supporting portion, a sliding portion, and a tension adjusting portion, the supporting portion is fixedly connected to the sliding portion and is slideable relative to the support body, one end of the tension adjusting portion is mounted on the support body, and the other end of the tension adjusting portion is mounted on the sliding portion for balancing gravity borne by the supporting portion; and the sliding portion comprises guide rails, a main body, and rollers, the main body is located in the support body and fixedly connected to the supporting portion, the guide rails are arranged on two sides of the main body and fixedly connected to the support body for guiding the main body, the rollers are rotationally connected to the main body and inserted into the guide rails for assisting the main body in moving up and down, the sliding portion further comprises a friction force auxiliary structure arranged on two sides of the main body, and the friction force auxiliary structure may swing to be in contact with the guide rails to decrease a friction force of the main body when the main body moves up and down.

Preferably, the friction force auxiliary structure comprises rotating blocks and track correction blocks, the track correction blocks are two in number and are symmetrically arranged on two sides of the rotating blocks, the rotating blocks are rotationally mounted on the main body through bolts, diameters of holes for accommodating the bolts on the rotating blocks are greater than diameters of the bolts, the track correction blocks are in a state of expansion from the rotating blocks to one side, and the track correction blocks are located in the guide rails and have gaps between their edges and inner side walls of the guide rails.

Preferably, the sliding portion further comprises a limiting block, the limiting block is fixedly connected to the main body and located between the two guide rails, and the limiting block is in contact with the guide rails for assisting the main body in guidance.

Preferably, the tension adjusting portion comprises a tension spring, a pull rope, and a moving block, one end of the tension spring is fixedly connected to the support body and located between the main body and the moving block for providing resistance for the main body, one end of the pull rope is fixedly connected to the main body, the other end of the pull rope is fixedly connected to the moving block, the pull rope is used in cooperation with the tension spring through a free end of the tension spring, and the moving block is slideably connected to the support body through a threaded rod in threaded connection thereon.

Preferably, the tension adjusting portion further comprises a fixed pulley, the fixed pulley is located above the main body and rotationally connected to the support body, and one end of the pull rope is wound on the fixed pulley and fixedly connected to the main body.

Preferably, the connecting structure comprises a connecting rod and a telescopic sliding assembly, one end of the connecting rod is rotationally connected to the supporting portion, the other end of the connecting rod is connected to the bearing member fixing structure through the telescopic sliding assembly, and the telescopic sliding assembly is mounted on the connecting rod for sliding the bearing member fixing structure relative to the support body.

Preferably, the telescopic sliding assembly comprises a bearing rod, a sliding limiting member, and a sliding slot, the sliding slot is provided on the connecting rod for accommodating the sliding limiting member, and the sliding limiting member is sleeved on the bearing rod for assisting the bearing rod in moving.

Preferably, the sliding limiting member comprises a lower limiting frame and an upper limiting frame, the lower limiting frame and the upper limiting frame form an "I" shape sleeved on the bearing rod, the connecting rod is located between the lower limiting frame and the upper limiting frame, and the upper limiting frame and the lower limiting frame are both slideably connected to the sliding slot through auxiliary wheels.

Preferably, the sliding limiting member further comprises positioning columns and a limiting plate, the positioning columns are arranged on the bearing rod for positioning the limiting plate, the limiting plate is inserted into the upper limiting frame and is in contact with outer edge surfaces of the auxiliary wheels, and the limiting plate is also rotationally connected with bolts that are inserted into the bearing rod and are in threaded connection with the bearing rod.

Preferably, the bearing rod is connected to the bearing member fixing structure through a universal joint.

Preferably, the bearing member fixing structure may rotate by 180° along an axis of a rotating shaft of the universal joint connected to the bearing rod, and the bearing member fixing structure may rotate by 135° along an axis of a rotating shaft inside the universal joint.

Preferably, the connecting rod is connected to the supporting portion through a connecting column having a sawtooth-shaped pattern, and the connecting column having the sawtooth-shaped pattern provides damping when the connecting rod rotates along an axis of the connecting column.

Preferably, the supporting portion may be fixed to at any height of the support body.

The present invention has the following beneficial effects.

Through design of the tension spring, the pull rope, and the moving block in the present invention, heights of bearing members may be adjusted when the bearing members with different weights are mounted. Moreover, during movement of the moving block, the threaded rod may be directly rotated by means of a tool, so as to achieve the purpose of adjustment without the need to disassemble the support body.

The present invention limits a moving direction of the main body by adopting the rollers arranged on the two sides of the main body and the guide rails fixed in the support body, and may achieve auxiliary limiting again through the limiting block arranged between the two guide rails during movement of the main body. The moving direction of the main body is further limited through arrangement of the limiting block and the guide rails.

The present invention may reduce the number of times and time of direct contact between the main body and tracks by adopting the rotating blocks arranged on the two sides of the main body and the track correction blocks arranged on the rotating blocks during up and down movement of the main body. Moreover, threaded holes connected between the rotating blocks and the main body are greater than a screw rod used for rotation limiting. Therefore, during the up and down movement of the main body, the rotating blocks and the track correction blocks thereon may tilt up and down or swing left and right, thereby enabling flat surfaces of the rollers or side edges of the main body to be in direct contact with the guide rails as little as possible and enabling curved surfaces of the rollers to be in contact with the guide rails as much as possible to decrease friction forces during sliding.

By adopting the telescopic sliding assembly arranged in the connecting structure in the present invention, the bearing rod may be better moved through the auxiliary wheels and the sliding slot. Meanwhile, the position of the bearing rod may be limited under the action of the positioning columns and the limiting plate, and the bearing rod may be fixed when being at a suitable position.

BRIEF DESCRIPTION OF DRAWINGS

FIG. 12 is an explosive structural schematic diagram of the connecting structure in the present invention; and in the figures, 1—support body; 2—base; 3—bearing member fixing structure; 4—supporting portion; 5—guide rail; 6—main body; 7—roller; 8—rotating block; 9—track correction block; 10—limiting block; 11—tension spring; 12—pull rope; 13—moving block; 14—threaded rod; 15—fixed pulley; 16—connecting rod; 17—bearing rod; 18—sliding slot; 19—lower limiting frame; 20—upper limiting frame; 21—auxiliary wheel; 22—positioning column; 23—limiting plate; 24—universal joint.

DESCRIPTION OF EMBODIMENTS

Specific embodiments of the present invention are further described in detail below in conjunction with the drawings.

Figure 1:
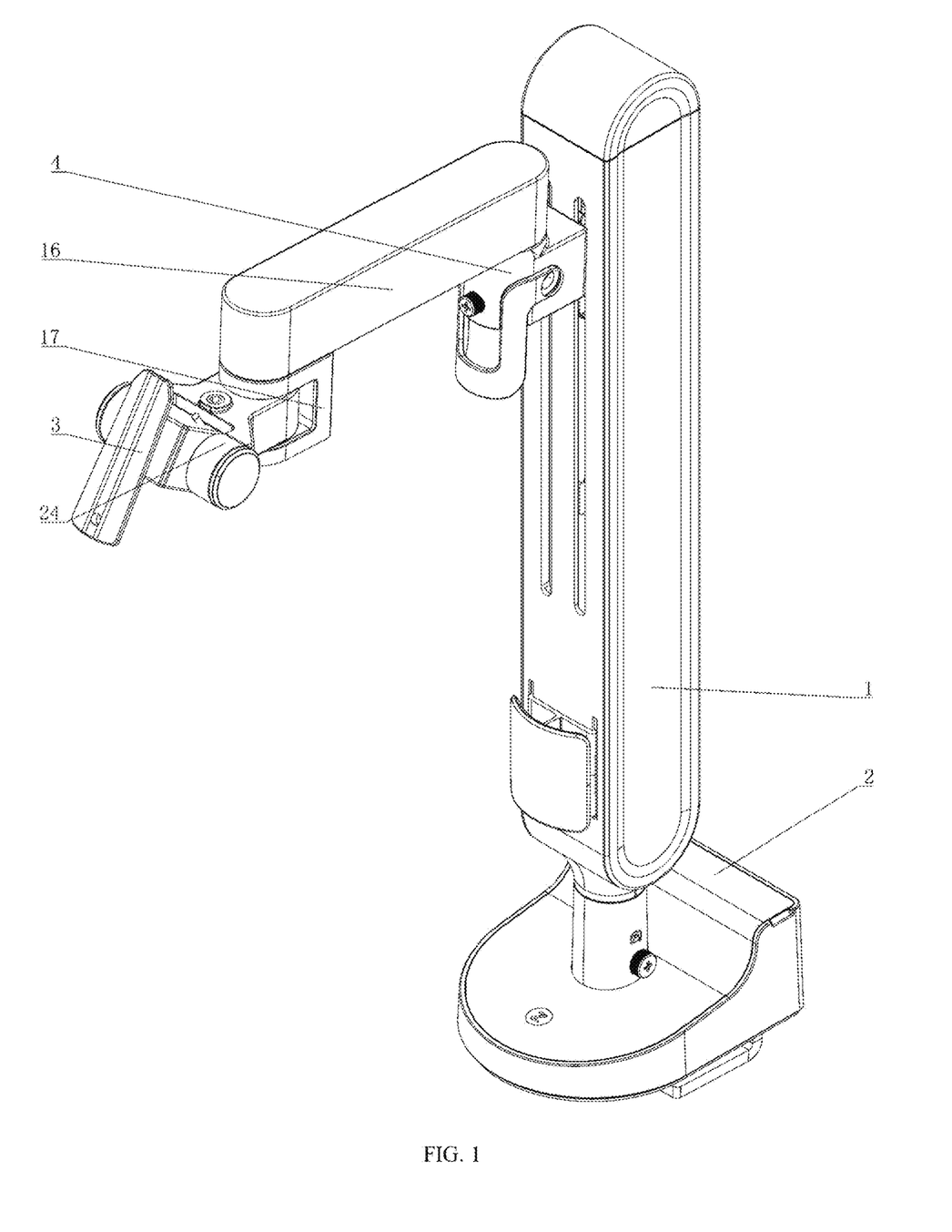
FIG. 1 is a three-dimensional structural schematic diagram of the present invention.
Figure 2:
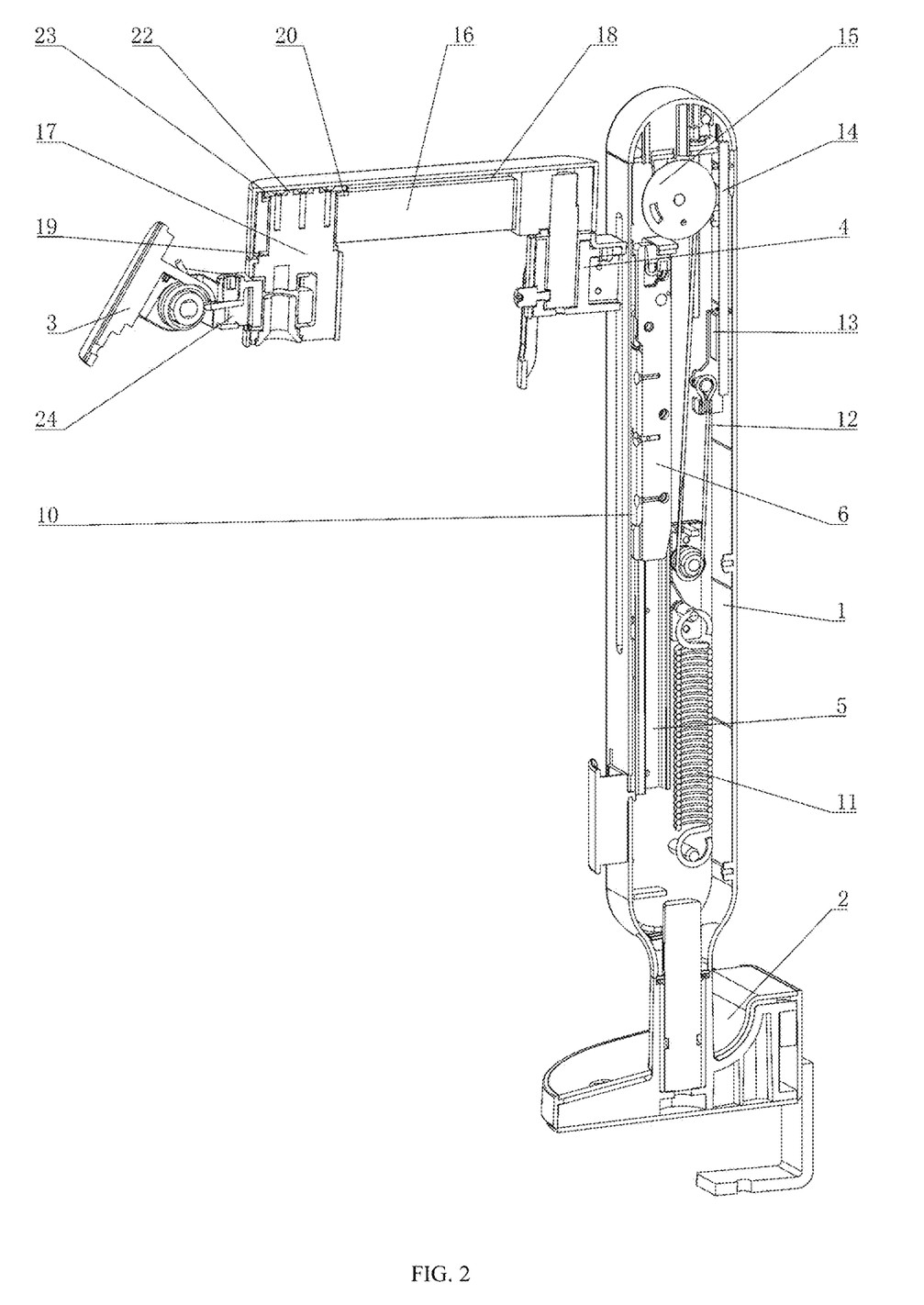
FIG. 2 is a sectional right-view structural schematic diagram of the present invention.
Figure 3:
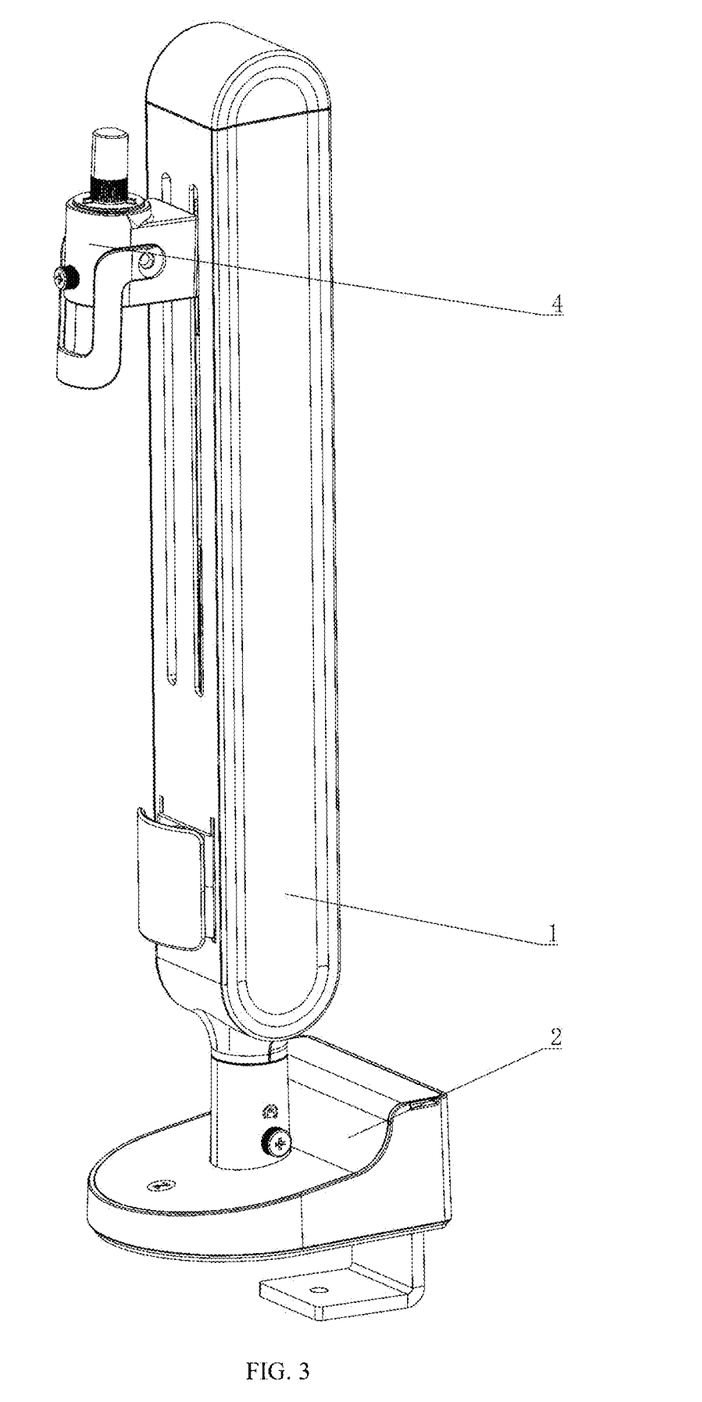
FIG. 3 is a three-dimensional structural schematic diagram after removal of a connecting structure and a bearing member fixing structure in the present invention.
Figure 4:
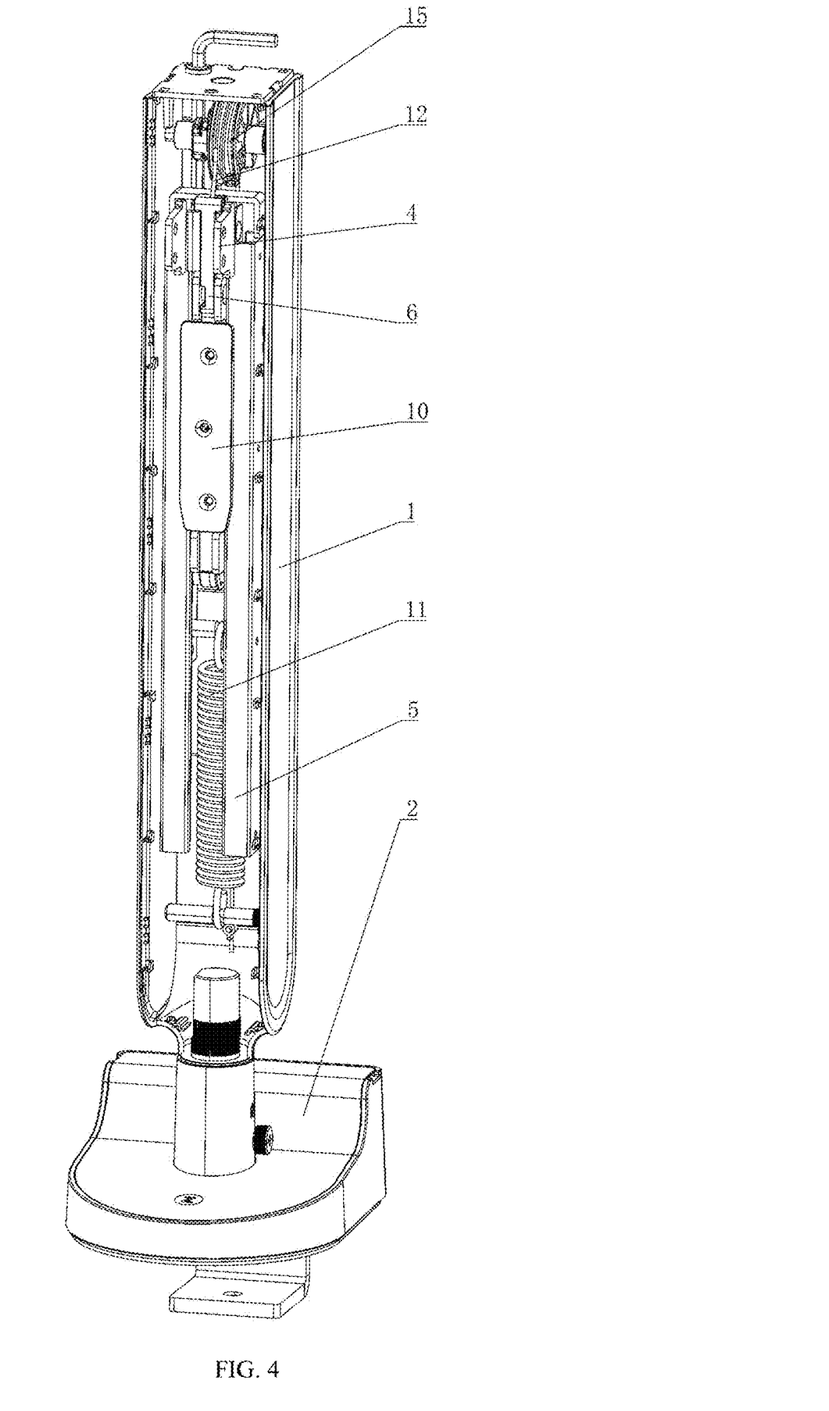
FIG. 4 is a sectional front-view structural schematic diagram of the present invention.
Figure 5:
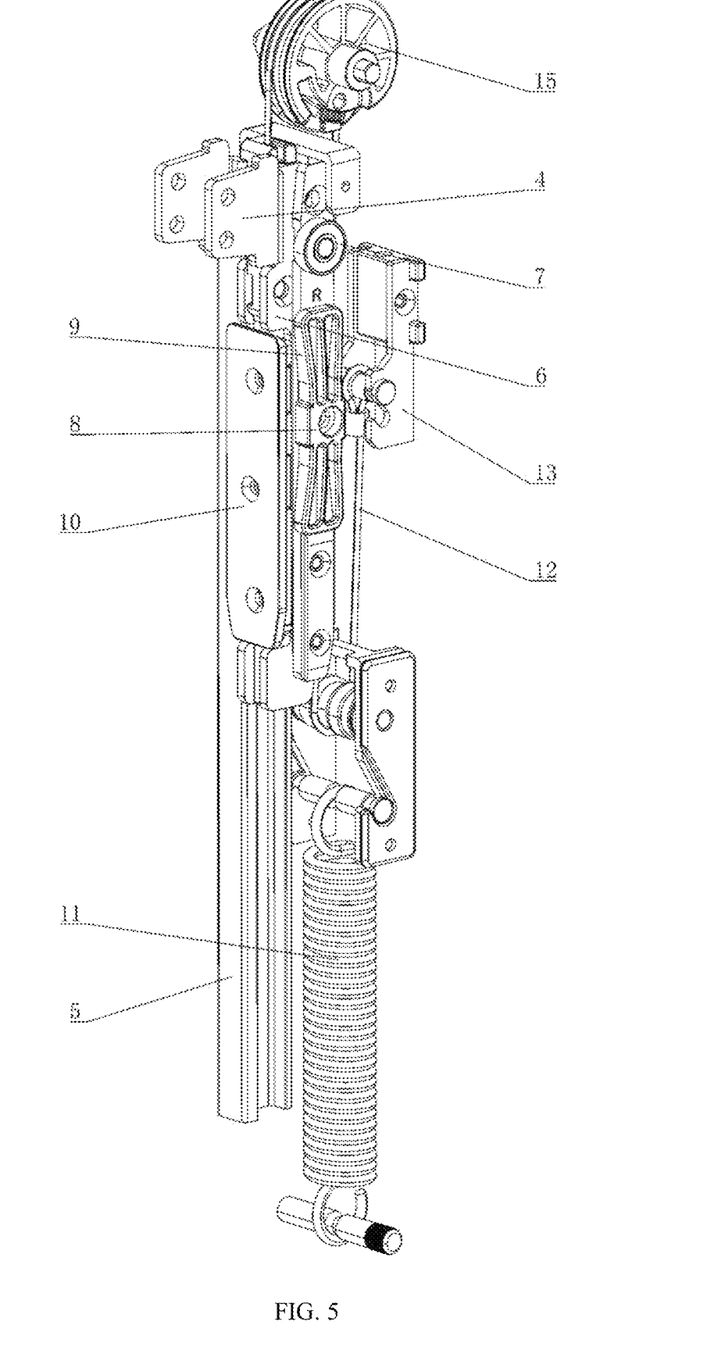
FIG. 5 is a three-dimensional structural schematic diagram of a lifting structure in the present invention.
Figure 6:
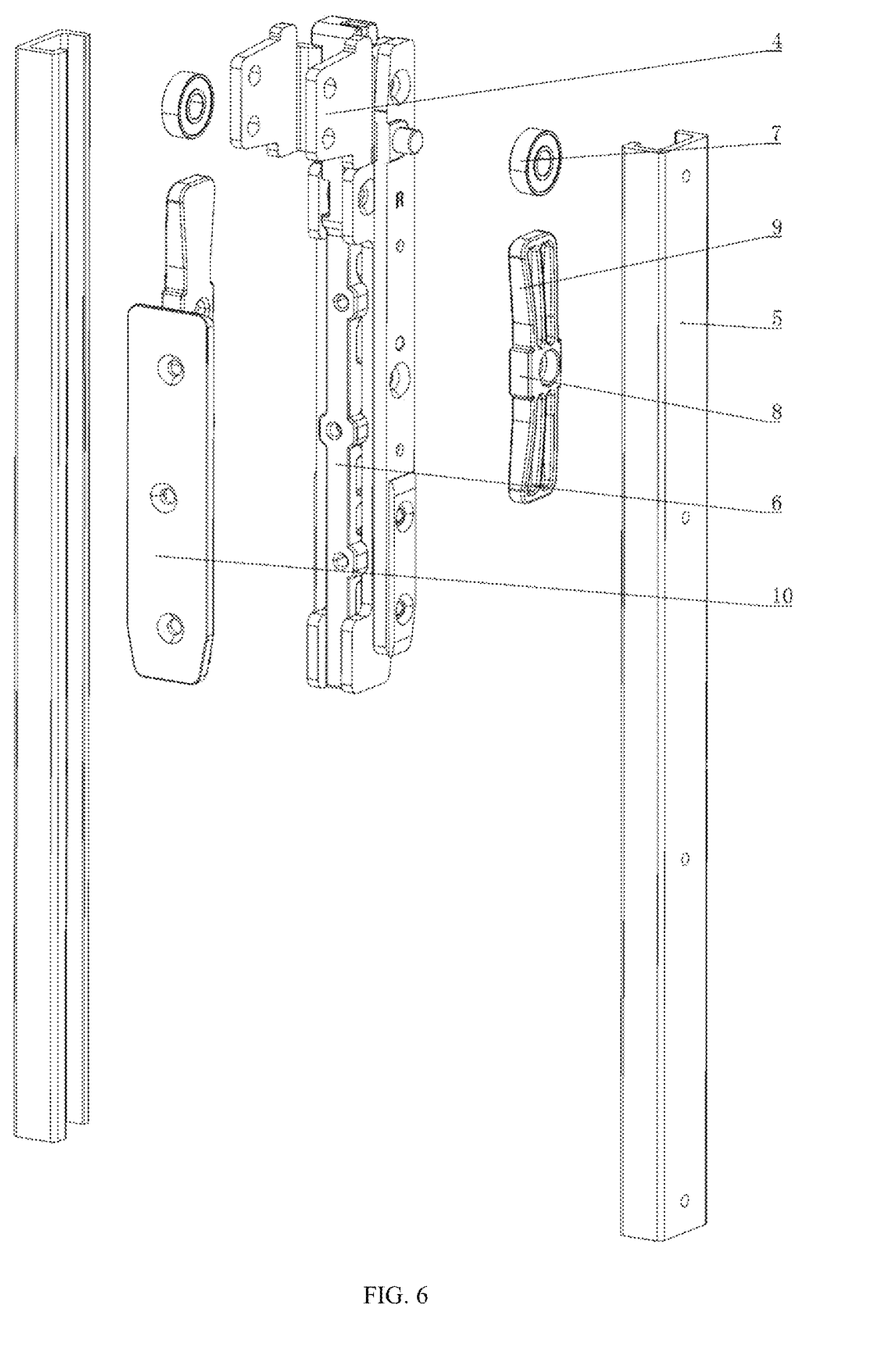
FIG. 6 is an explosive three-dimensional structural schematic diagram of the lifting structure in the present invention.
Figure 7:
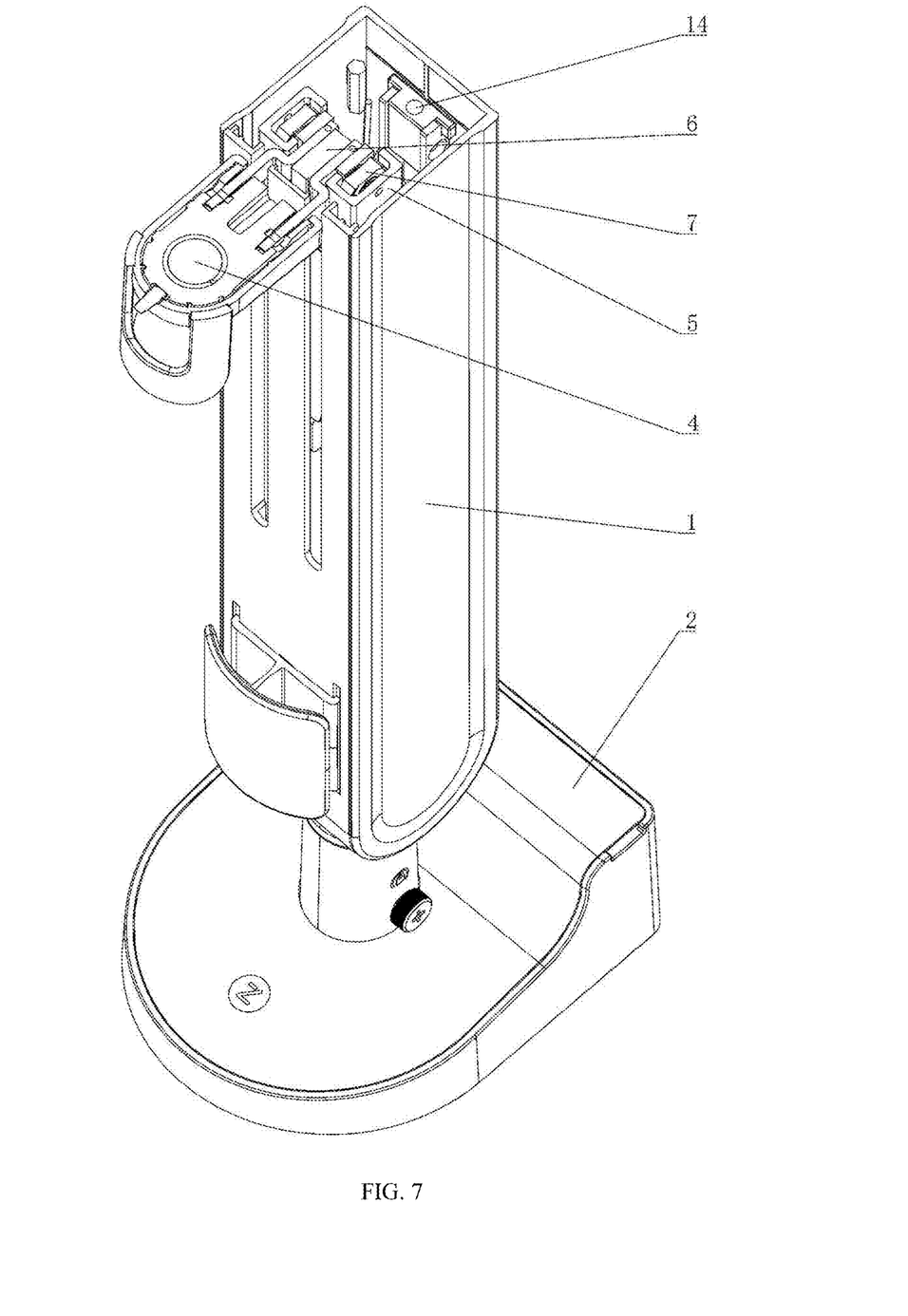
FIG. 7 is a sectional top-view structural schematic diagram of the present invention.
Figure 8:
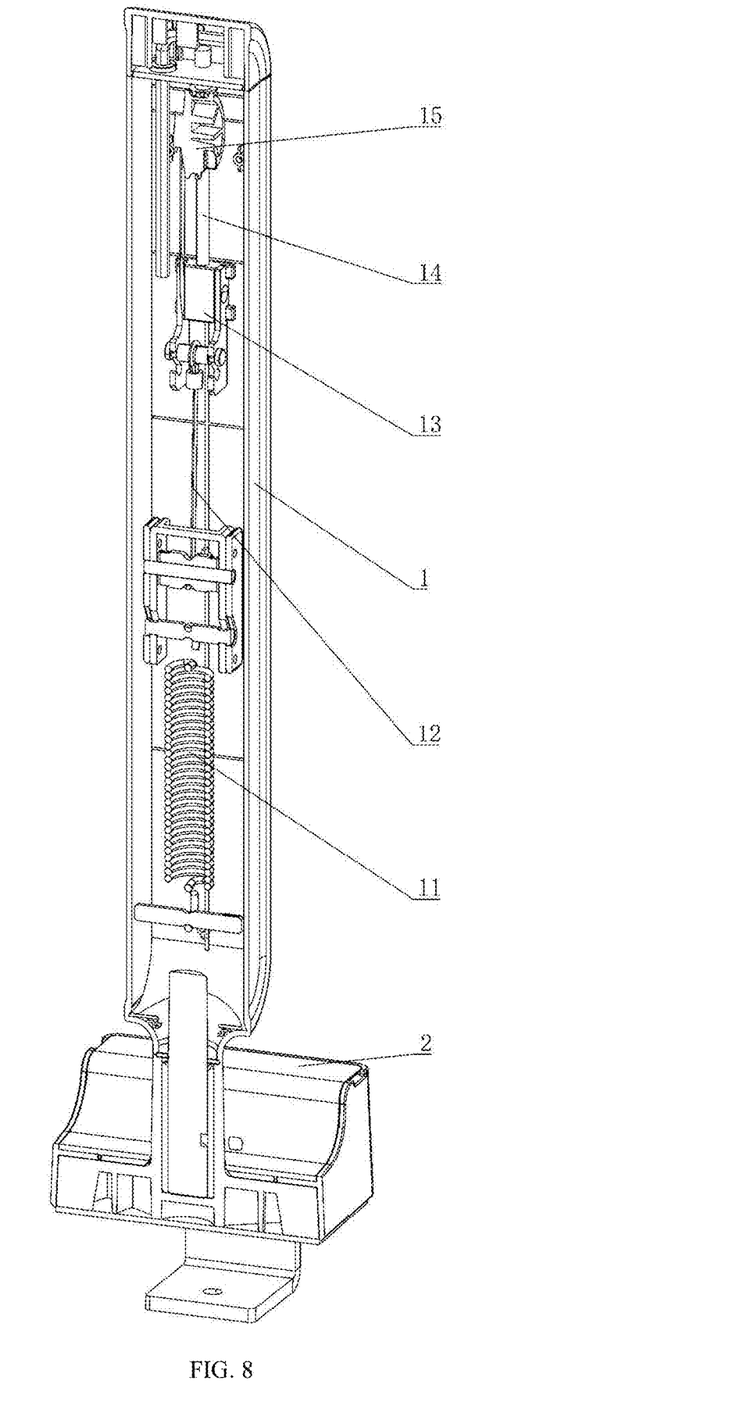
FIG. 8 is a sectional front-view structural schematic diagram of the present invention.
Figure 9:
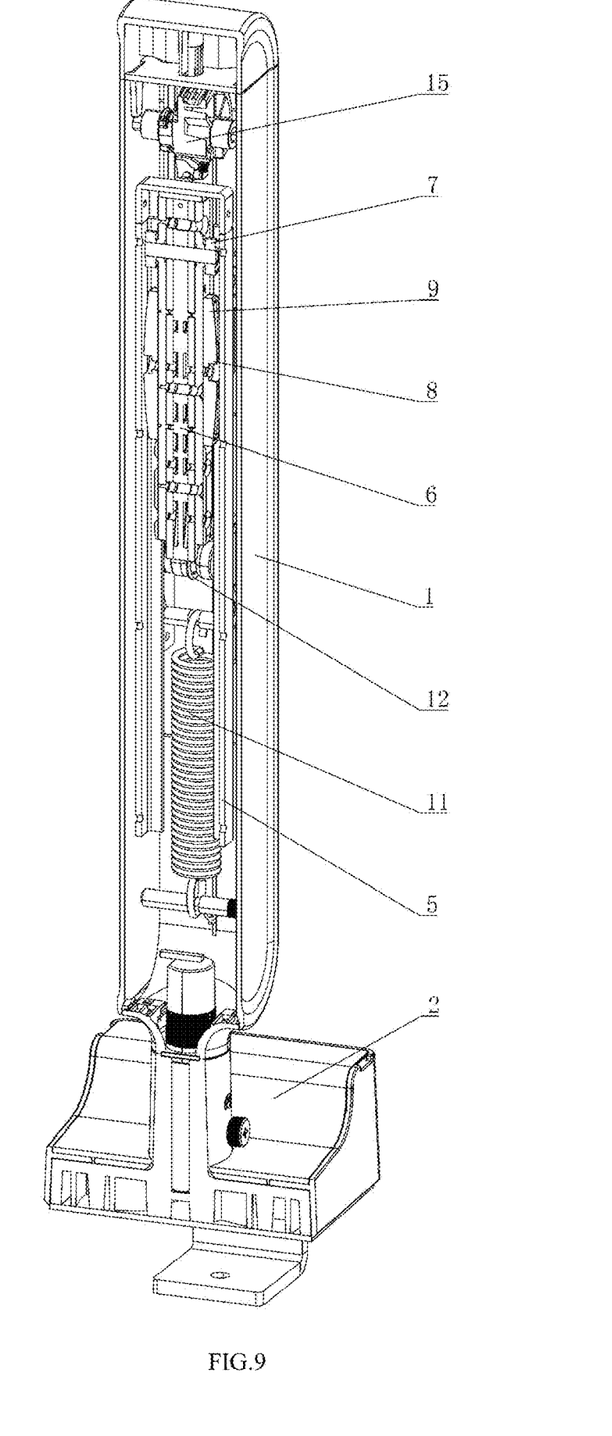
FIG. 9 is a sectional front-view structural schematic diagram of the present invention.
Figure 10:
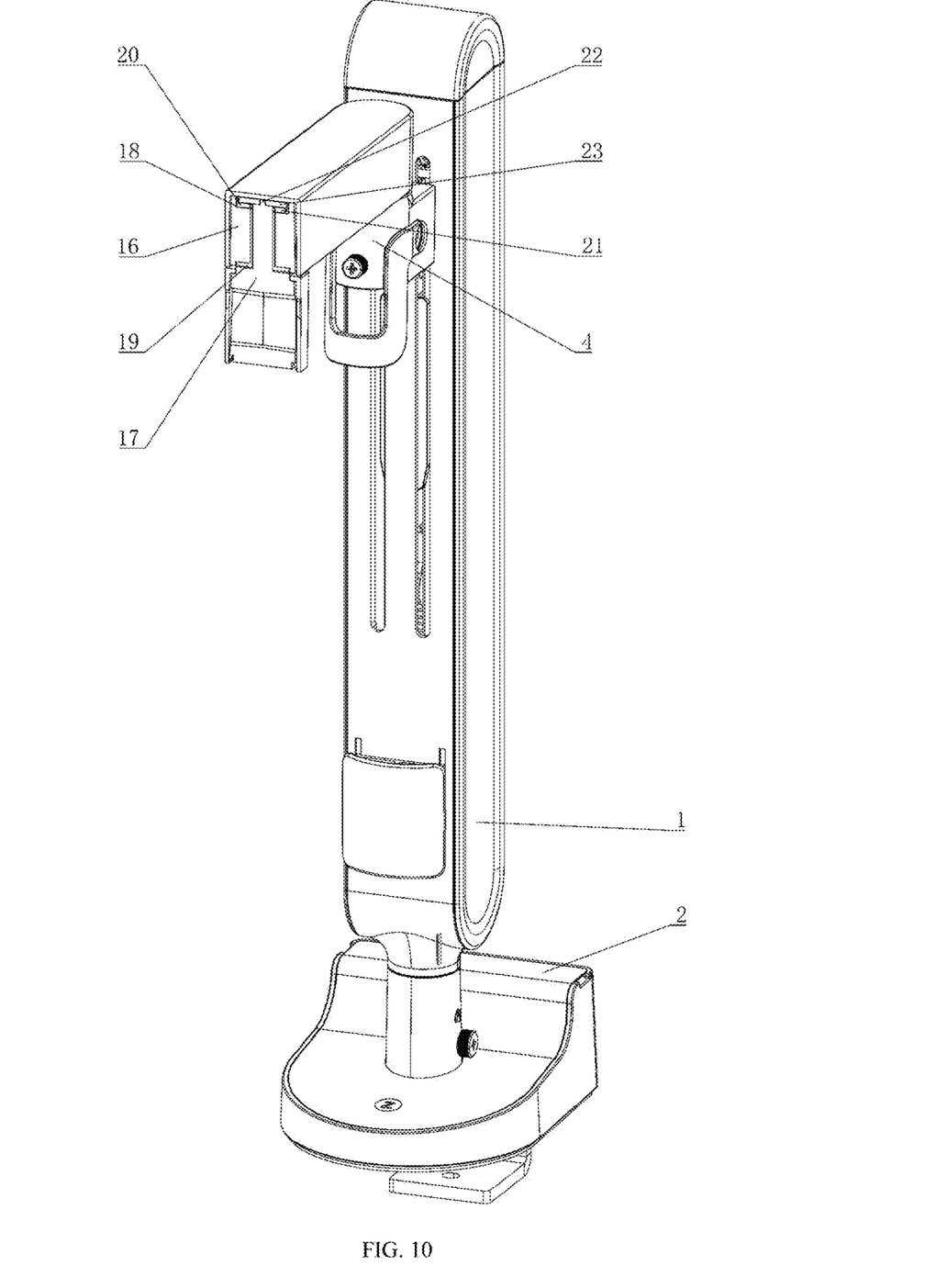
FIG. 10 is a sectional front-view structural schematic diagram of the present invention.
Figure 11:
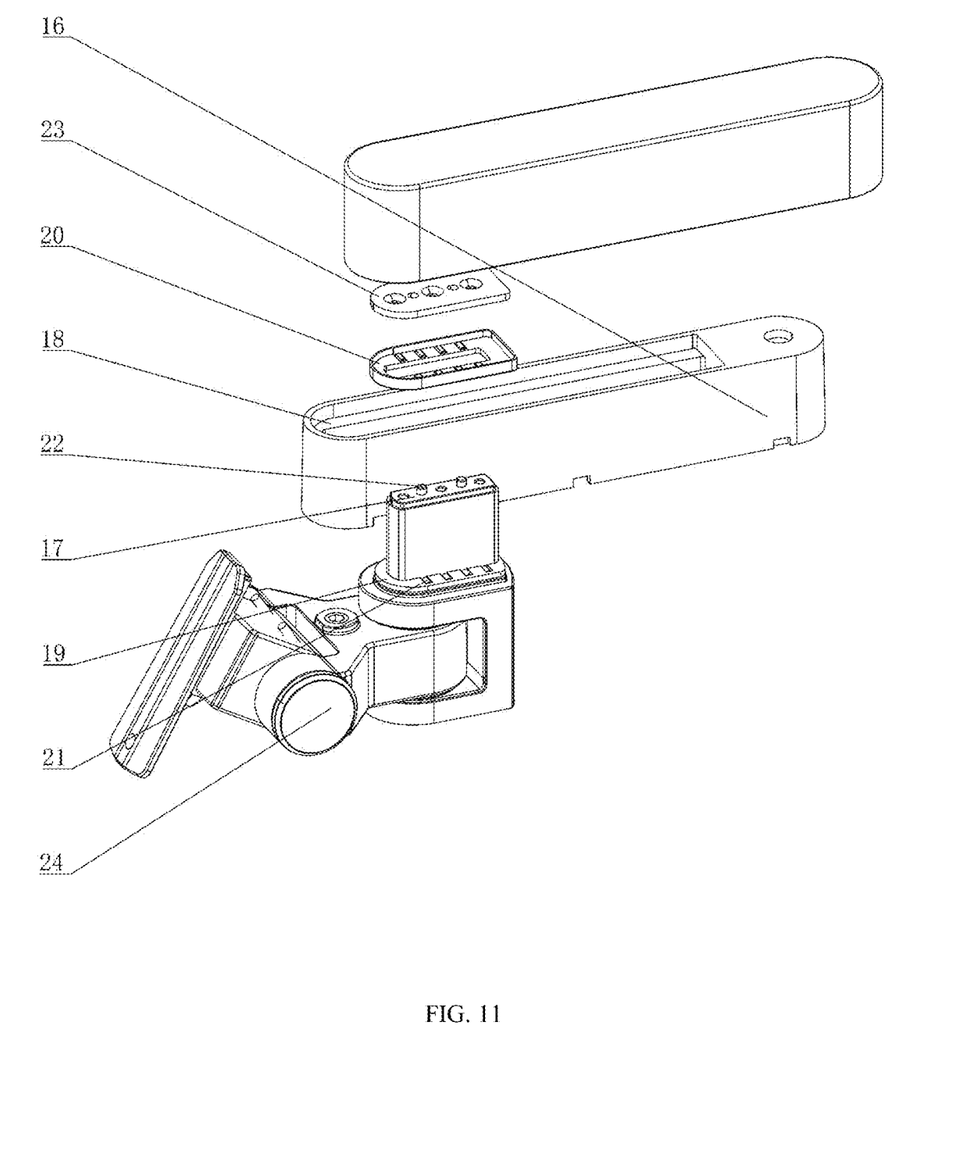
FIG. 11 is an explosive structural schematic diagram of the connecting structure in the present invention.
Figure 12:
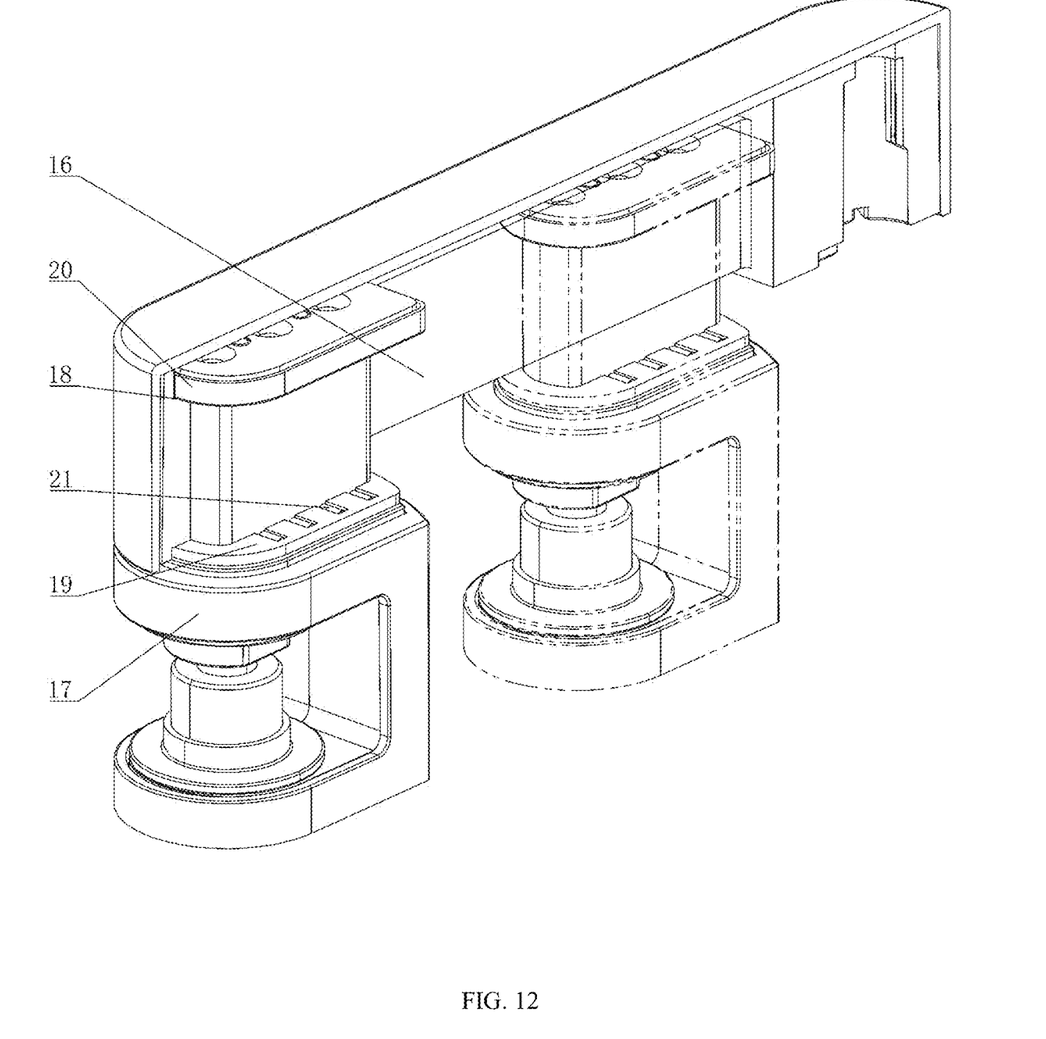

Referring to FIGS. 1-12 of the description, a display support facilitating multi-directional adjustment and being telescopic comprises a support body 1, a base 2, a lifting structure, a connecting structure, and a bearing member fixing structure 3, wherein the base 2 is mounted below the support body 1, the support body 1 and the base 2 may be rotationally connected through a rotating shaft arranged on the support body 1, and a corresponding fixing limiting structure that may be clamped to a plane to be fixed is arranged in the base 2.

The lifting structure is mounted on the support body 1, and a bearing member mounted on the bearing member fixing structure 3 through the lifting structure may move up and down relative to the support body 1. The lifting structure comprises a supporting portion 4, a sliding portion, and a tension adjusting portion, the supporting portion 4 is mounted on the sliding portion, the supporting portion 4 moves up and down through the sliding portion, and the tension adjusting portion is mounted inside the support body 1 for adjusting resistance of the sliding portion.

The supporting portion 4 comprises two fins fixedly connected to the sliding portion and a rotating shaft mounted between the two fins, and rotation of the bearing member fixing structure 3 relative to the support body 1 may be achieved through the rotating shaft.

The sliding portion comprises guide rails 5, a main body 6, and rollers 7, the main body 6 is mounted in the support body 1 for providing a fixing foundation for the fins of the supporting portion 4, the guide rails 5 are two in number, the two guide rails 5 are arranged in parallel on two sides of the main body 6 and fixedly connected to the support body 1, and the rollers 7 are rotationally connected to the main body 6 and inserted into the guide rails 5. A moving direction of the main body 6 is limited and guided through the guide rails 5 and the rollers 7. Moreover, sliding friction between the main body 6 and the guide rails 5 may be converted into rolling friction through the rollers 7, thereby decreasing friction forces between the main body 6 and the guide rails 5.

The sliding portion further comprises a friction force auxiliary structure arranged on two sides of the main body 6, and the friction force auxiliary structure comprises rotating blocks 8 and track correction blocks 9, wherein the track correction blocks 9 are two in number and are symmetrically arranged on two sides of the rotating blocks 8, the two track correction blocks 9 expand from sides in contact with the rotating blocks 8 to a direction away from each other, and under the action of the track correction blocks 9 and the rotating blocks 8, the friction force auxiliary structure is in a bowknot shape.

The rotating blocks 8 are rotationally connected to the main body 6 through bolts, and maximum-diameter portions of the track correction blocks 9 and inner side walls of the guide rails 5 have gaps. During up and down movement of the main body 6, since the rotating blocks 8 are rotationally connected to the main body 6 through the bolts, when the main body 6 is located close to the guide rails 5, the track correction blocks 9 tilt under the action of an inertial force, and their edges are in contact with the inner side walls of the guide rails 5, thereby decreasing a friction force of the main body 6 during the up and down movement.

In order to assist limited sliding of the main body 6, a limiting block 10 is also fixedly connected to the main body 6. The limiting block 10 is located between the two guide rails 5 and is in contact with outer edge surfaces of the guide rails 5. The limiting block 10 is limited through the two guide rails 5, thereby enabling the main body 6 to be better moved along a vertical direction.

The tension adjusting portion comprises a tension spring 11, a pull rope 12, and a moving block 13. One end of the pull rope 12 is fixedly connected to the moving block 13, and the other end of the pull rope 12 is a free end that passes through one end of the tension spring 11 and is fixedly connected to the main body 6. One end of the tension spring 11 used in cooperation with the pull rope 12 is sleeved on the pull rope 12, the pull rope 12 may move freely at the end portion, and the other end of the tension spring 11 is fixedly connected to the support body 1. By adjusting the position of the moving block 13, the tension spring 11 may be stretched or loosened, thereby achieving the purpose of providing different degrees of resistance to the main body 6.

The moving block 13 is slideably connected to the support body 1, meanwhile, a threaded rod 14 is rotationally connected to the support body 1, and the threaded rod 14 is slideably connected to the moving block 13. Up and down movement of the moving block 13 is achieved through rotation of the threaded rod 14.

The tension adjusting portion further comprises a fixed pulley 15 and a tension spring 11 auxiliary assembly, the fixed pulley 15 is located above the main body 6, and the pull rope 12 is wound on the fixed pulley 15 and fixedly connected to the main body 6, wherein the fixed pulley 15 is rotationally connected to the support body 1, the tension spring 11 auxiliary assembly is arranged on one side of the tension spring 11 that is connected to the pull rope 12, and one end of the tension spring 11 is better sleeved on the pull rope 12 through the tension spring 11 auxiliary assembly.

Through the action of the tension spring 11, the threaded rod 14 and the moving block 13, the supporting portion 4 may be fixed to any height of the support body 1.

The connecting structure comprises a connecting rod 16 and a sliding assembly, one end of the connecting rod 16 is rotationally connected to the supporting portion 4, the other end of the connecting rod is connected to the bearing member fixing structure 3 through the sliding assembly, and the telescopic sliding assembly is mounted on the connecting rod 16 for sliding the bearing member fixing structure 3 relative to the support body 1.

The connecting rod 16 is connected to the supporting portion 4 through a connecting column having a sawtooth-shaped pattern, and the connecting column having the sawtooth-shaped pattern provides damping when the connecting rod 16 rotates along an axis of the connecting column, wherein the connecting column having the sawtooth-shaped pattern has a same arrangement position as the aforementioned rotating shaft arranged in the supporting portion 4.

The telescopic sliding assembly comprises a bearing rod 17, a sliding limiting member, and a sliding slot 18, the sliding slot 18 is provided on the connecting rod 16 for accommodating the sliding limiting member, and the sliding limiting member is sleeved on the bearing rod 17 for assisting the bearing rod 17 in moving.

The sliding limiting member comprises a lower limiting frame 19 and an upper limiting frame 20, the lower limiting frame 19 and the upper limiting frame 20 form an "I" shape sleeved on the bearing rod 17, the connecting rod 16 is located between the lower limiting frame 19 and the upper limiting frame 20, and the upper limiting frame 20 and the lower limiting frame 19 are both slideably connected to the sliding slot 18 through auxiliary wheels 21.

The sliding limiting member further comprises positioning columns 22 and a limiting plate 23, the positioning columns 22 are arranged on the bearing rod 17 for positioning the limiting plate 23, the limiting plate 23 is inserted into the upper limiting frame 20 and is in contact with outer edge surfaces of the auxiliary wheels 21, and the limiting plate 23 is also rotationally connected with bolts that are inserted into the bearing rod 17 and are in threaded connection with the bearing rod 17.

In a process of rotating the bolts, the purpose of using the limiting plate 23 to press the auxiliary wheels 21 may be achieved. The upper limiting frame 20 and the lower limiting frame 19 may be directly limited and fixed by applying pressure to the auxiliary wheels 21.

The bearing rod 17 is connected to the bearing member fixing structure 3 through a universal joint 24.

The bearing member fixing structure 3 may rotate by 180° along an axis of a rotating shaft of the universal joint 24 connected to the bearing rod 17. The axis of the rotating shaft connected to the bearing rod 17 may enable the bearing member mounted on the bearing member fixing structure 3 to rotate by 180° along a horizontal direction, and the rotating direction is set at 90° on one side.

The bearing member fixing structure 3 may rotate by 135° along an axis of a rotating shaft inside the universal joint 24. The axis of the rotating shaft arranged inside the universal joint may enable the bearing member fixing structure to rotate by 135° along a vertical direction, and the rotating direction is set at 65° on one side.

The bearing member fixing structure 3 is used for fixing an object to be borne. The base 2 and the bearing member fixing structure 3 are relatively mature existing technologies and are not described in detail herein.

When the present invention is in use, the base 2 is first mounted and fixed at a suitable position on the plane by a mounting person. After the mounting is completed, the support body 1 is inserted into the base 2 by the mounting person. Under the action of the rotating shaft on the support body 1, the support body 1 may be rotated along the rotating shaft. At this time, the tension spring 11, the fixed pulley 15, the moving block 13, the main body 6, the rollers 7 and the friction force auxiliary structure are all completely mounted in the support body 1.

The supporting portion 4 is fixed to the main body 6 by the mounting person, and then the connecting rod 16 and the supporting portion 4 are fastened by the mounting person. Under the action of the rotating shaft in the supporting portion 4, the connecting rod 16 may be rotated relative to the support body 1, and the bearing member fixing structure 3 may be moved under the action of the telescopic sliding assembly on the connecting rod 16. When the bearing member fixing structure is moved to a suitable position, a working person tightens the bolts to limit the position of the bearing rod 17 through the limiting plate 23 to prevent the position of the bearing rod 17 from moving.

When the bearing member is mounted on the bearing member fixing structure 3, the working person adjusts the resistance of the tension spring 11 by rotating the threaded rod 14, and suspension of the bearing member at different heights is achieved by changing the resistance of the tension spring 11.

Through design of the tension spring 11, the pull rope 12, and the moving block 13 in the present invention, heights of bearing members may be adjusted when the bearing members with different weights are mounted. Moreover, during movement of the moving block 13, the threaded rod 14 may be directly rotated by means of a tool, so as to achieve the purpose of adjustment without the need to disassemble the support body 1.

The present invention limits a moving direction of the main body 6 by adopting the rollers 7 arranged on the two sides of the main body 6 and the guide rails 5 fixed in the support body 1, and may achieve auxiliary limiting again through the limiting block 10 arranged between the two guide rails 5 during movement of the main body 6. The moving direction of the main body 6 is further limited through arrangement of the limiting block 10 and the guide rails 5.

The present invention may reduce the number of times and time of direct contact between the main body 6 and tracks by adopting the rotating blocks 8 arranged on the two sides of the main body 6 and the track correction blocks 9 arranged on the rotating blocks 8 during up and down movement of the main body 6. Moreover, threaded holes connected between the rotating blocks 8 and the main body 6 are greater than a screw rod used for rotation limiting. Therefore, during the up and down movement of the main body 6, the rotating blocks 8 and the track correction blocks 9 thereon may tilt up and down or swing left and right, thereby enabling flat surfaces of the rollers 7 or side edges of the main body 6 to be in direct contact with the guide rails 5 as little as possible and enabling curved surfaces of the rollers 7 to be in contact with the guide rails 5 as much as possible to decrease friction forces during sliding.

By adopting the telescopic sliding assembly arranged in the connecting structure in the present invention, the bearing rod 17 may be better moved through the auxiliary wheels 21 and the sliding slot 18. Meanwhile, the position of the bearing rod 17 may be limited under the action of the positioning columns 22 and the limiting plate 23, and the bearing rod 17 may be fixed when being at a suitable position.

What is claimed is:

1. A display support facilitating multi-directional adjustment and being telescopic, comprising a support body, a base, a lifting structure, a connecting structure, and a bearing member fixing structure, wherein the base is arranged below the support body for fixing the support body, the lifting structure is mounted on the support body for moving a bearing member up and down, one end of the connecting structure is connected to the lifting structure, second end of the connecting structure is connected to the bearing member fixing structure for externally extending the bearing member, and the bearing member fixing structure is used for mounting and displaying the bearing member, wherein the lifting structure comprises a supporting portion, a sliding portion, and a tension adjusting portion, the supporting portion is fixedly connected to the sliding portion and is slideable relative to the support body, one end of the tension adjusting portion is mounted on the support body, and second end of the tension adjusting portion is mounted on the sliding portion for balancing gravity borne by the supporting portion;

the tension adjusting portion comprises a tension spring, a pull rope, and a moving block, one end of the tension spring is fixedly connected to the support body and located between a main body and the moving block for providing resistance for the main body, one end of the pull rope is fixedly connected to the main body, second end of the pull rope is fixedly connected to the moving block, the pull rope is used in cooperation with the tension spring through a free end of the tension spring, and the moving block is slideably connected to the support body through a threaded rod in threaded connection thereon;

the sliding portion comprises the main body, a sliding auxiliary assembly, and a friction force auxiliary assembly, and the sliding auxiliary assembly is used for assisting the main body in sliding along a height direction of the support body;

the sliding auxiliary assembly comprises guide rails, rollers, and a limiting block, the main body is located in the support body and fixedly connected to the supporting portion, the guide rails are arranged on two sides of the main body and fixedly connected to the support body for guiding the main body, the rollers are rotationally connected to the main body and inserted into the guide rails for assisting the main body in moving up and down, the limiting block is fixedly connected to the main body and located between the two guide rails, and the limiting block is in contact with the guide rails for assisting the main body in guidance; and the friction force auxiliary assembly is used for decreasing a friction force of the main body during sliding and comprises rotating blocks and track correction blocks, the track correction blocks are two in number and are symmetrically arranged on two sides of the rotating blocks, the track correction blocks are in a state of expansion from the rotating blocks to one side, the rotating blocks are rotationally mounted on the main body through bolts, diameters of holes for accommodating the bolts on the rotating blocks are greater than diameters of the bolts, the track correction blocks are located in the guide rails and have gaps between their edges and inner side walls of the guide rails, and the rotating blocks are mounted on the main body and may deflect left and right as well as up and down for decreasing the friction force of the main body during sliding when the main body moves.

2. The display support facilitating multi-directional adjustment and being telescopic according to claim 1, wherein the tension adjusting portion further comprises a fixed pulley, the fixed pulley is located above the main body and rotationally connected to the support body, and one end of the pull rope is wound on the fixed pulley and fixedly connected to the main body.

3. The display support facilitating multi-directional adjustment and being telescopic according to claim 1, wherein the connecting structure comprises a connecting rod and a telescopic sliding assembly, one end of the connecting rod is rotationally connected to the supporting portion, second end of the connecting rod is connected to the bearing member fixing structure through the telescopic sliding assembly, and the telescopic sliding assembly is mounted on the connecting rod for sliding the bearing member fixing structure relative to the support body.

4. The display support facilitating multi-directional adjustment and being telescopic according to claim 3, wherein the telescopic sliding assembly comprises a bearing rod, a sliding limiting member, and a sliding slot, the sliding slot is provided on the connecting rod for accommodating the sliding limiting member, and the sliding limiting member is sleeved on the bearing rod for assisting the bearing rod in moving.

5. The display support facilitating multi-directional adjustment and being telescopic according to claim 4, wherein the sliding limiting member comprises a lower limiting frame and an upper limiting frame, the lower limiting frame and the upper limiting frame form an "I" shape sleeved on the bearing rod, the connecting rod is located between the lower limiting frame and the upper limiting frame, and the upper limiting frame and the lower limiting frame are both slideably connected to the sliding slot through auxiliary wheels.

6. The display support facilitating multi-directional adjustment and being telescopic according to claim 5, wherein the sliding limiting member further comprises positioning columns and a limiting plate, the positioning columns are arranged on the bearing rod for positioning the limiting plate, the limiting plate is inserted into the upper limiting frame and is in contact with outer edge surfaces of the auxiliary wheels, and the limiting plate is also rotationally connected with bolts that are inserted into the bearing rod and are in threaded connection with the bearing rod.

7. The display support facilitating multi-directional adjustment and being telescopic according to claim 6, wherein the bearing rod is connected to the bearing member fixing structure through a universal joint.

8. The display support facilitating multi-directional adjustment and being telescopic according to claim 6, wherein the bearing member fixing structure may rotate by 180° along an axis of a rotating shaft of the universal joint connected to the bearing rod, and the bearing member fixing structure may rotate by 135° along an axis of a rotating shaft inside the universal joint.

9. The display support facilitating multi-directional adjustment and being telescopic according to claim 6, wherein the connecting rod is connected to the supporting portion through a connecting column having a sawtooth-shaped pattern, and the connecting column having the sawtooth-shaped pattern provides damping when the connecting rod rotates along an axis of the connecting column.

10. The display support facilitating multi-directional adjustment and being telescopic according to claim 6, wherein the supporting portion may be fixed to any height of the support body.

\* \* \* \* \*